(12) United States Patent
Nelson et al.

(10) Patent No.: US 11,592,206 B2
(45) Date of Patent: Feb. 28, 2023

(54) GAS-FUELED WATER HEATER APPLIANCE HAVING A FOAM BARRIER

(71) Applicant: Haier US Appliance Solutions, Inc., Wilmington, DE (US)

(72) Inventors: Jonathan D. Nelson, Louisville, KY (US); Timothy David Gantt, Goshen, KY (US); Gregory L. Hutchison, Shelbyville, KY (US); Gary Allen Elder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 196 days.

(21) Appl. No.: 16/937,798

(22) Filed: Jul. 24, 2020

(65) Prior Publication Data

US 2022/0026107 A1 Jan. 27, 2022

(51) Int. Cl.
*F24H 1/18* (2022.01)
*B29C 44/12* (2006.01)
*F16L 59/02* (2006.01)

(52) U.S. Cl.
CPC ......... *F24H 1/182* (2013.01); *B29C 44/1247* (2013.01); *F16L 59/02* (2013.01)

(58) Field of Classification Search
CPC ....... F16L 59/02; B29C 44/1247; F24H 1/182
See application file for complete search history.

(56) References Cited

U.S. PATENT DOCUMENTS

| | | | | |
|---|---|---|---|---|
| 4,372,028 A | * | 2/1983 | Clark | B29C 44/184 122/19.2 |
| 4,749,532 A | | 6/1988 | Pfeffer | |
| 4,901,676 A | * | 2/1990 | Nelson | B32B 27/12 425/383 |
| 4,958,620 A | * | 9/1990 | Nelson | B23P 15/22 122/19.2 |
| 5,002,709 A | * | 3/1991 | Chevalier | F24H 1/0045 264/55 |
| 5,040,697 A | | 8/1991 | Nelson | |
| 5,421,475 A | * | 6/1995 | Nelson | F24H 1/182 220/592.28 |

(Continued)

FOREIGN PATENT DOCUMENTS

| | | | | |
|---|---|---|---|---|
| AT | 516037 B1 | * | 2/2016 | F24H 1/182 |
| DE | 20110291 U1 | * | 9/2001 | F24H 1/182 |
| FR | 2636317 A3 | * | 3/1990 | |

*Primary Examiner* — Steven S Anderson, II
(74) *Attorney, Agent, or Firm* — Dority & Manning, P.A.

(57) ABSTRACT

A method for insulating a gas-fueled water heater includes providing a tank for storage of water for heating and a combustion chamber adjacent to the tank. The method includes providing a compressed foam barrier circumferentially around the tank. Further, the method includes positioning a covering around the tank from a top end to a bottom end, the covering extending over the compressed foam barrier. Moreover, the method includes decompressing the compressed foam barrier such that an outer diameter of the foam barrier expands up to and seals against the covering so as to separate an internal volume defined between an outer surface of the tank and the covering into a first section and a second section. Then, the method includes injecting a foam material into the first section so as to provide a foam barrier around at least a portion of an outer surface of the tank.

17 Claims, 8 Drawing Sheets

(56) References Cited

U.S. PATENT DOCUMENTS

| | | | | |
|---|---|---|---|---|
| 5,509,566 | A * | 4/1996 | Nelson | F24H 1/182 |
| | | | | 220/592.25 |
| 6,885,816 | B1 * | 4/2005 | Hicks | B29C 44/1247 |
| | | | | 264/45.2 |
| 6,941,899 | B2 | 9/2005 | Bradenbaugh | |
| 7,650,859 | B2 | 1/2010 | Foster | |
| 2005/0109288 | A1 * | 5/2005 | Bradenbaugh | F24H 1/182 |
| | | | | 122/19.2 |

* cited by examiner

GAS-FUELED WATER HEATER APPLIANCE HAVING A FOAM BARRIER

FIELD OF THE INVENTION

The present subject matter relates generally to gas-fueled water heater appliances, and more particularly to gas-fueled water heater appliances having improved foam barriers.

BACKGROUND OF THE INVENTION

A variety of energy sources are used in creating hot water for commercial and residential use including electric, solar, and various fuels. Natural gas and propane are preferred by some customers due to, for example, the relatively quick heating rate. These fuels are supplied as a gas that is burned in a combustion chamber to provide heat energy to raise the water temperature in a storage tank.

Temperatures in the combustion chamber are relatively high and can, for example, reach 600 degrees Fahrenheit or higher during normal operation. A flame is created by burning a mixture of the gaseous fuel and air. Proper combustion requires that the air and fuel are provided within a particular ratio to ensure, for example, complete combustion and avoid wasted fuel or the production of unwanted by-products such as carbon monoxide. The high temperatures of the combustion chambers exceed temperatures that standard water heater insulating foam can achieve.

Therefore, typical hot water heaters include a barrier between the tank and the combustion chamber. Existing barriers, however, are very difficult to install consistently and successfully. For example, in one instance, a plastic belt-bag is wrapped around the tank and liquid foam is injected therein. An operator must then rush to assemble the wrapper before the foam within the belt has expanded too far. Therefore, timing is key and difficult to achieve. In another instance, a sponge-like donut-shaped material is rolled over the tank at a certain height position higher than final desire position. The tank covering is then placed over the tank. Placement of the covering, however, rolls the donut-shaped material down the tank, leaving the final position of the donut-shaped material inconsistent with each installation. In still another instance, a foam bag with a belt is used, which requires the use of a large plastic bag that is positioned before the covering is assembled. Accordingly, the foam goes inside the bag. However, such foam bags often result in poor foam distribution due to kinks, traps, etc.

Accordingly, a gas-fueled heater appliance with features for improved insulation of the tank from the combustion chamber would be desirable. In particular, it would be advantageous to provide a gas-fueled heater appliance with features to address one or more of the above-identified challenges.

BRIEF DESCRIPTION OF THE INVENTION

Aspects and advantages of the invention will be set forth in part in the following description, or may be obvious from the description, or may be learned through practice of the invention.

In one aspect of the present disclosure, a method for insulating a gas-fueled water heater is provided. The gas-fueled water heater has a tank for storage of water for heating and a combustion chamber adjacent to the tank, the combustion chamber containing a gas burner to heat the water in the tank. The method includes providing a compressed foam barrier circumferentially around the tank. Further, the method includes positioning a covering around the tank from a top end to a bottom end, the covering extending over the compressed foam barrier. Moreover, the method includes decompressing the compressed foam barrier such that an outer diameter of the compressed foam barrier expands up to and seals against the covering so as to separate an internal volume defined between an outer surface of the tank and the covering into a first section and a second section. In addition, the method includes injecting a foam material into the first section of the internal volume so as to provide a foam barrier around at least a portion of an outer surface of the tank. Thus, the foam barrier prevents the foam material from entering the second section of the internal volume.

In one aspect of the present disclosure, a system for insulating a gas-fueled water heater is provided. The system includes a compressed foam barrier for positioning circumferentially around a tank of the water heater. Further, the compressed foam barrier is constructed of a foam body that is compressed, at least in part, via a compression member. The system also includes a covering for covering the tank from a top end to a bottom end. Further, the covering extends over the compressed foam barrier when positioned around the tank, wherein, upon installation around the tank, the compressed foam barrier is decompressed such that an outer diameter of the compressed foam barrier expands up to and seals against an inner surface of the covering so as to separate an internal volume defined between an outer surface of the tank and the covering into a first section and a second section. Moreover, the system includes an injectable foam material for providing a foam barrier around at least a portion of an outer surface of the tank.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
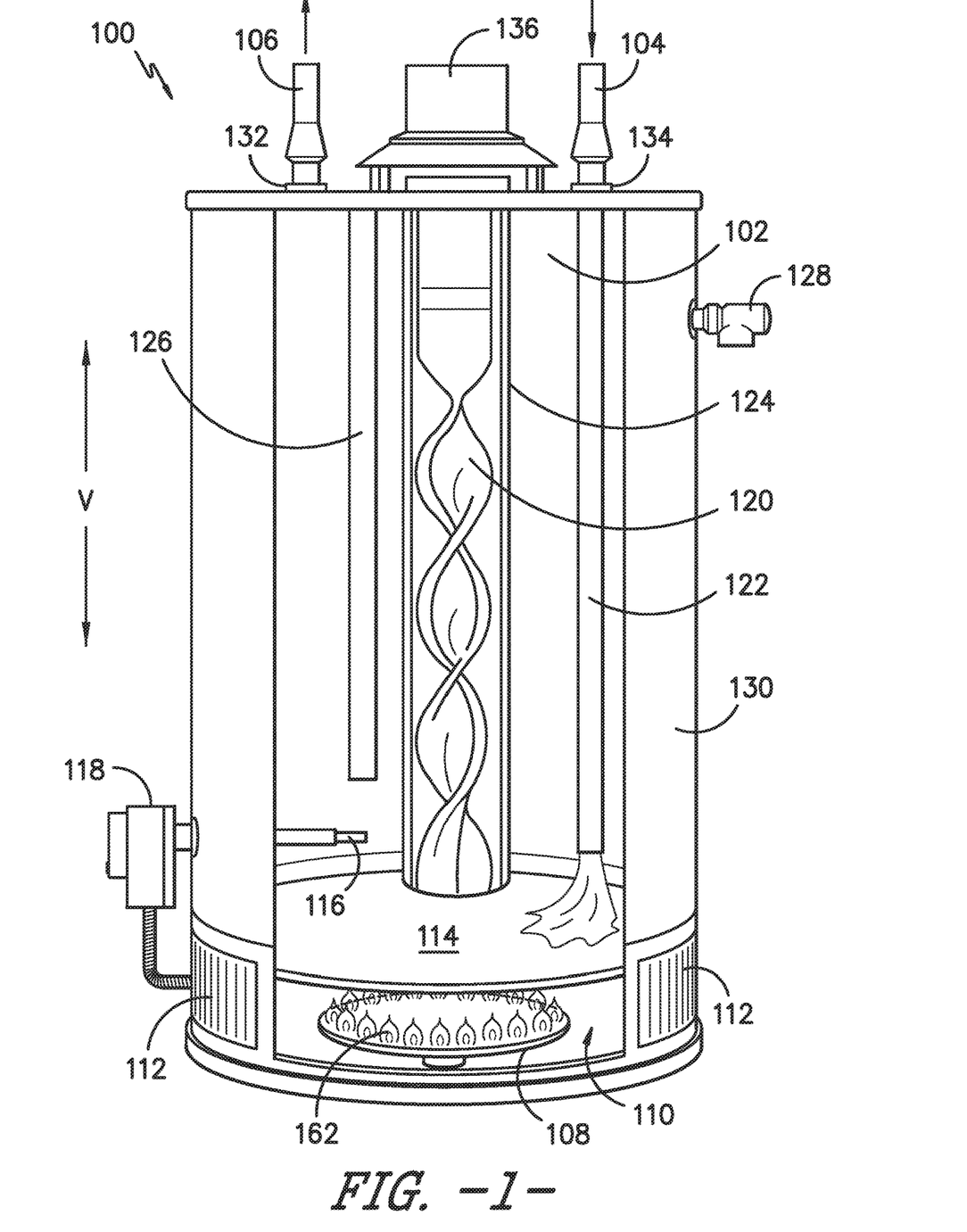
FIG. 1 provides a partially cut away, side view of a water heater appliance according to exemplary embodiments of the present disclosure.

Referring now to the drawings, FIG. 1 illustrates a partial sectional, side view of an exemplary water heater 100 of the present invention. Water heater 100 includes a tank 102 where water is stored and heated. Water is supplied to tank 102 by inlet line 104. Heated water is supplied by tank 102 through outlet line 106. Water heater 100 is fluidly connected with lines 104 and 106 using connections 132 and 134. In turn, lines 104 and 106 connect with the water supply system of, for example, a residence or a commercial structure.

From line 104, water travels into tank 102 through a cold water dip tube 122 that generally extends along a vertical direction V towards the bottom 114 of tank 102. After being heated, water exits tank 102 by travelling vertically upward and out through outlet line 106. Anode rod 126 provides protection against corrosion attacks on tank 102 and other metal components of water heater 100. A pressure relief valve 128 provides for a release of water from tank 102 in the event the pressure rises above a predetermined amount.

Water heater 100 includes a combustion chamber 110 in which a gas burner 108 is centrally located. Gas burner 108 is supplied with a gaseous fuel (e.g., propane or natural gas). Air travels into combustion chamber 110 through flame arrestor 200 after passing through air intake 112 in cabinet 130. The resulting mixture of air and gas is ignited and burned to heat bottom 114 of tank 102 and its water contents. Hot combustion gas 120 exits combustion chamber 110 through a vent or flue 124 centrally located within tank 102. Heat exchange with flue 124 also helps heat water in tank 102. A baffle 120 promotes this heat exchange. Gas 120 exits water heater 100 though vent hood 136, which may be connected with additional vent piping (not shown).

A thermostat 116 measures the temperature of water in tank 102 and provides a signal to gas control valve module 118. As used herein, "a signal" is not limited to a single measurement of temperature and, instead, may include multiple measurements over time or continuous measurements over time. The signal may be provided through, for example, changes in current, voltage, resistance, or others. Depending upon whether the desired temperature has been reached as determined, for example, from the signal from thermostat 116, gas control valve module 118 regulates the flow of gas to burner 108.

Figure 2:
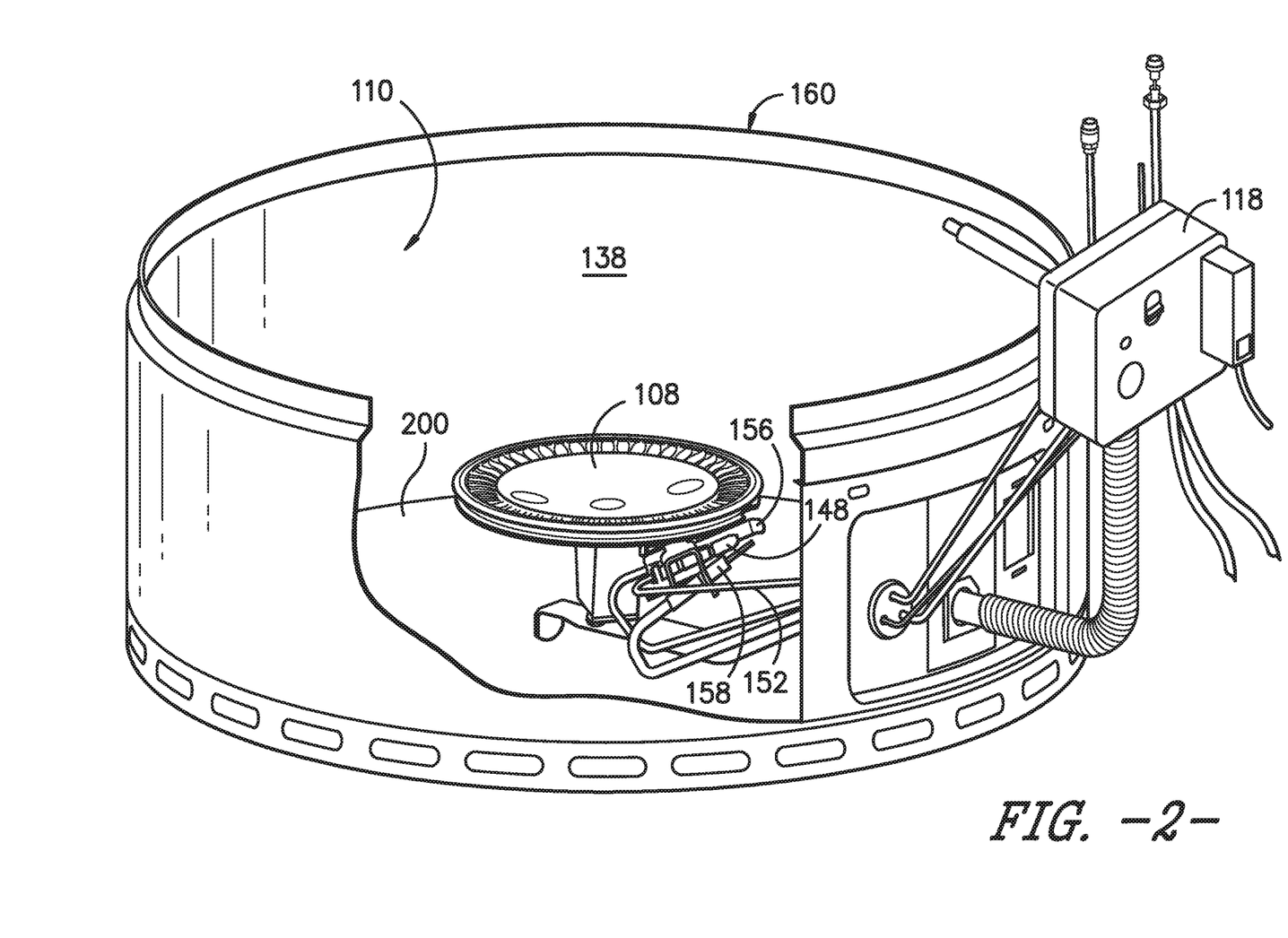
FIG. 2 provides a perspective view of an exemplary gas combustion chamber as may be used with the exemplary water heater appliance of FIG. 1.

Referring now to FIG. 2, combustion chamber 110 is formed by a chamber wall 138 that at least partially encloses combustion chamber 110 and may also provide support for tank 102 along top edge 160. As shown, chamber wall 138 encircles burner 108 and is spaced apart from burner 108. Chamber wall 138 may be part of cabinet 130 (FIG. 1) or may be a separate component. A flame arrestor 200 may extend along or across a bottom portion of chamber wall 138. In particular, flame arrestor 200 may be positioned between burner 108 and air intakes 112 along the vertical direction V. In other words, flame arrestor 200 may define a lower limit of the combustion chamber 200, below burner 108 and above air intakes 112. Air entering combustion chamber 200 will thus pass air intakes 112 before passing through flame arrestor 200 then combustion chamber 110.

Figure 3:
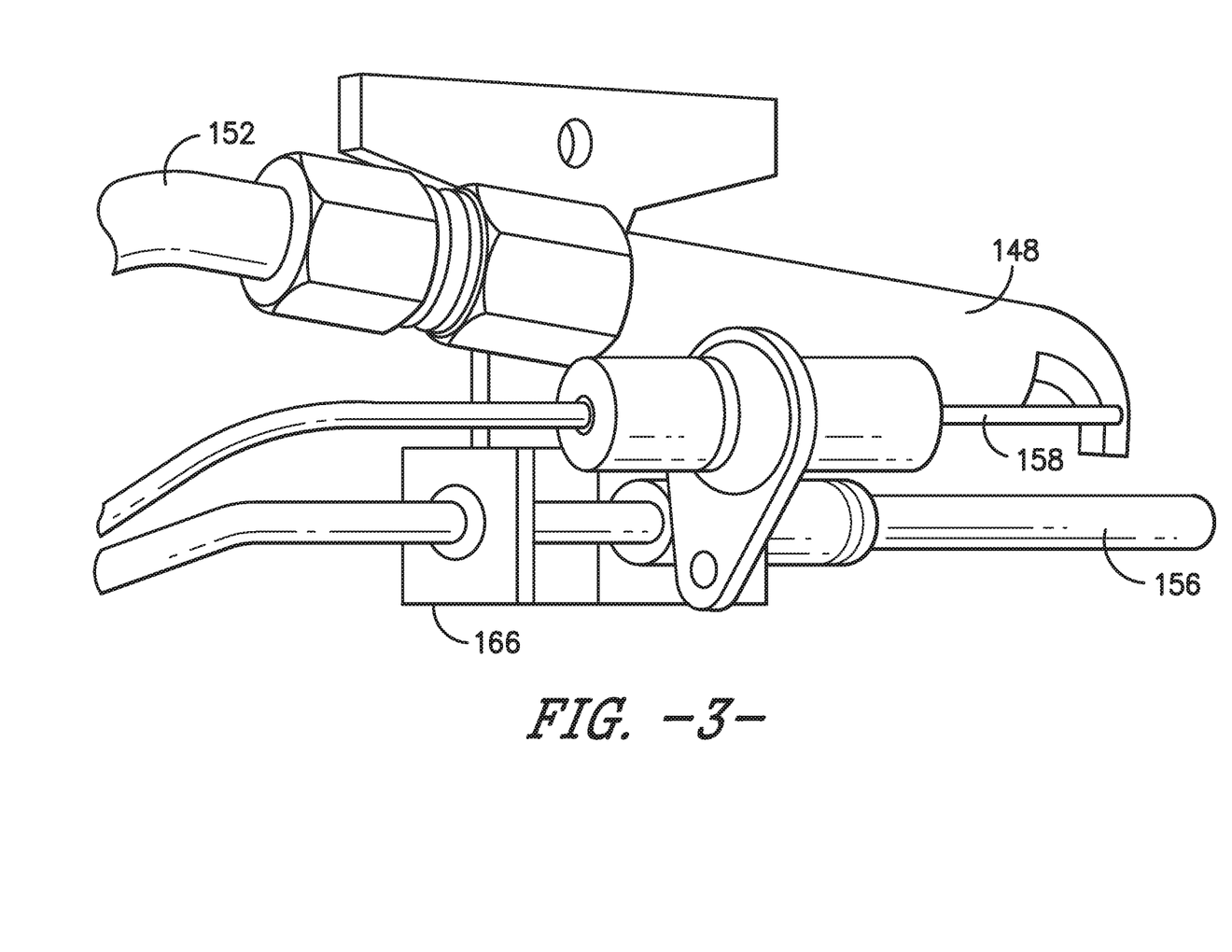
FIG. 3 provides a close-up view of certain exemplary components positioned adjacent to burner of the exemplary water heater appliance of FIGS. 1 and 2.

Referring now to FIG. 3, a close-up view of certain components positioned beneath and directly adjacent to gas burner 108 is provided. As shown, water heater 100 includes a pilot burner 148 that provides a pilot light to ignite a mixture of air and fuel at burner 108 when a gas valve (not shown) is open. An igniter 158 is positioned adjacent to pilot burner 148 and generates a spark used to ignite gaseous fuel and provide the pilot light. Gaseous fuel for pilot burner 108 is supplied by pilot burner fuel line 152. Gas valve control module 118 controls the flow of gaseous fuel through pilot burner fuel line 152 and the flow of gas to burner 108 from a gaseous fuel supply.

A thermo-electric device 156 is positioned adjacent to the pilot burner 148 and igniter 158. Thermo-electric device 156 may be a thermopile that can convert heat from pilot burner 148 into electrical energy, which can be used, for example, to power gas valve control module 118. Thermopile 156 may be constructed from, for example, a plurality of thermocouples connected in a series, for example. For this exemplary embodiment, a bracket 166 is used to position pilot burner 148, igniter 158, and thermopile 156 near gas burner 108.

Figure 9:
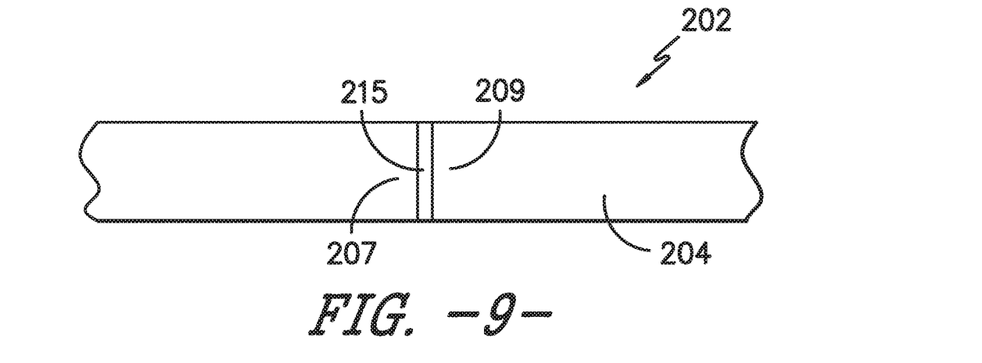
FIG. 9 provides a partial, elevation view of another embodiment of a foam barrier of a system for insulating a water heater appliance according to exemplary embodiments of the present disclosure.
Figure 10:
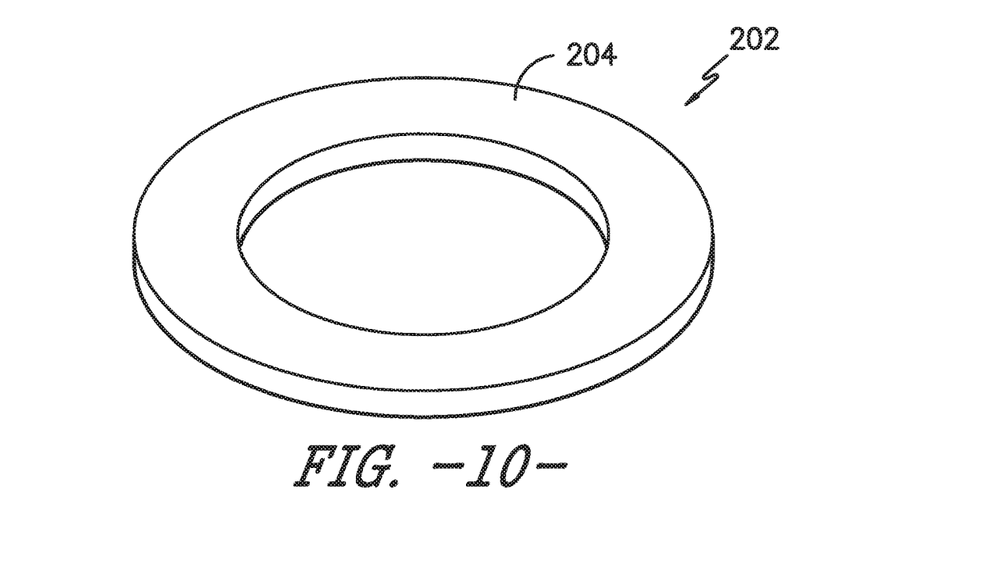
FIG. 10 provides a perspective view of still another embodiment of a foam barrier of a system for insulating a water heater appliance according to exemplary embodiments of the present disclosure.
Figure 11:
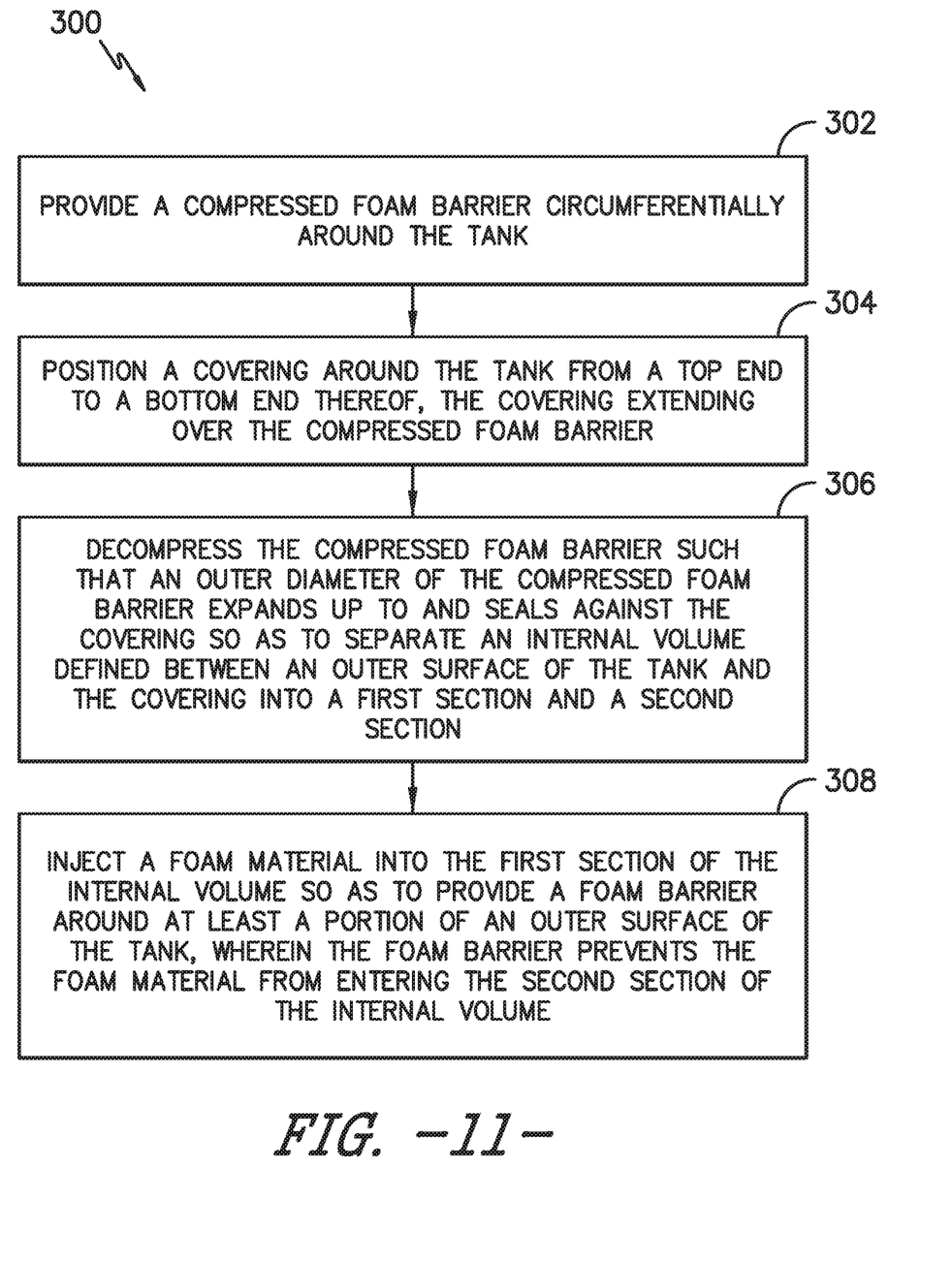
FIG. 11 provides a flow diagram of one embodiment of a method for insulating a water heater appliance according to exemplary embodiments of the present disclosure.

Turning now to FIGS. 4 through 11, various views of a system 200 and method 300 for insulating a gas-fueled water heater, such as water heater 100, is provided. For example, FIGS. 4-10 illustrate the water heater 100 and the system 200 for insulating the water heater according to the present disclosure, whereas FIG. 11 illustrates a flow diagram of the method 300 for insulating the water heater 100 according to the present disclosure.

Figure 4:
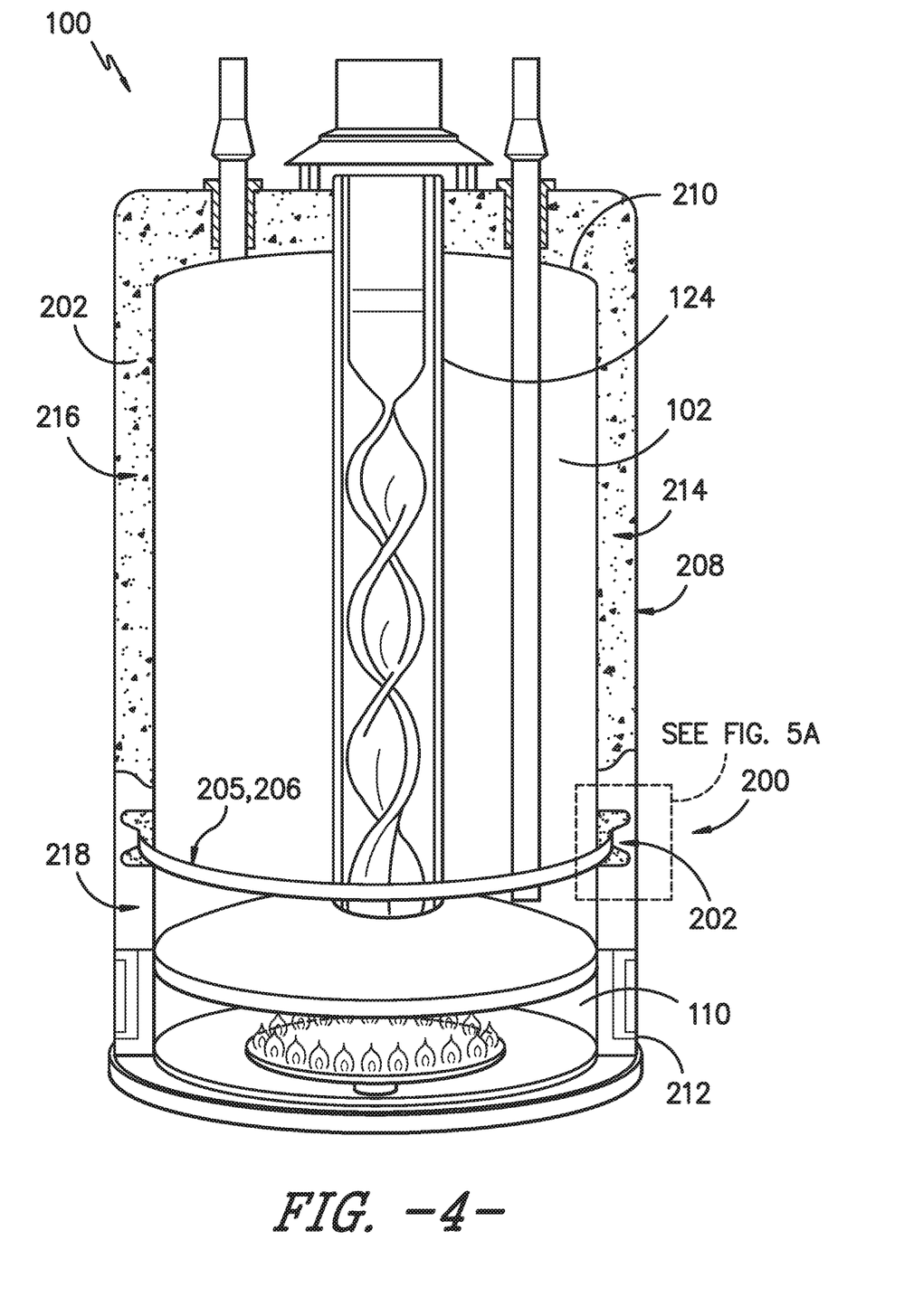
FIG. 4 provides a cross-sectional view of a water heater appliance according to exemplary embodiments of the present disclosure.

More specifically, as shown particularly in FIG. 4 and as mentioned, the water heater 100 includes tank 102 for storage of water for heating and combustion chamber 110.

Figure 5A:
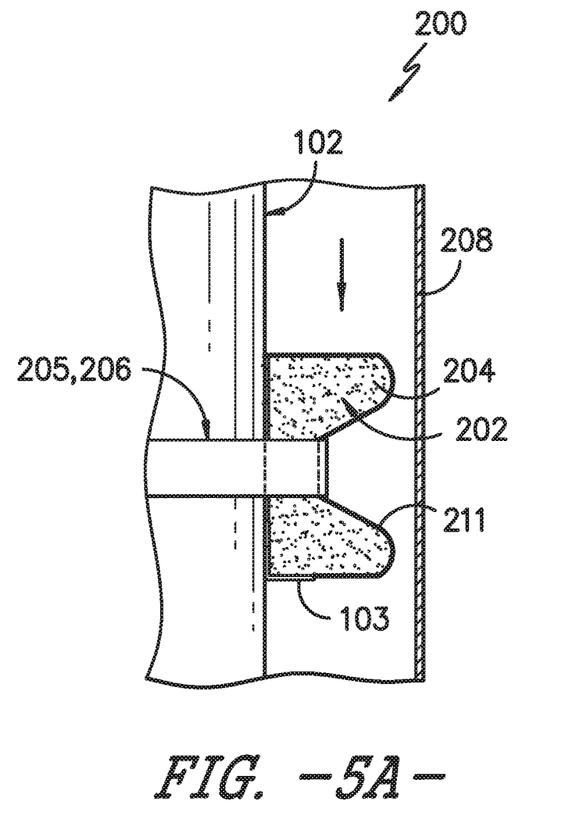
FIG. 5A provides a detailed, partial view of the water heater appliance of FIG. 4, particularly illustrating a compressed foam barrier installed around the water tank.
Figure 6:
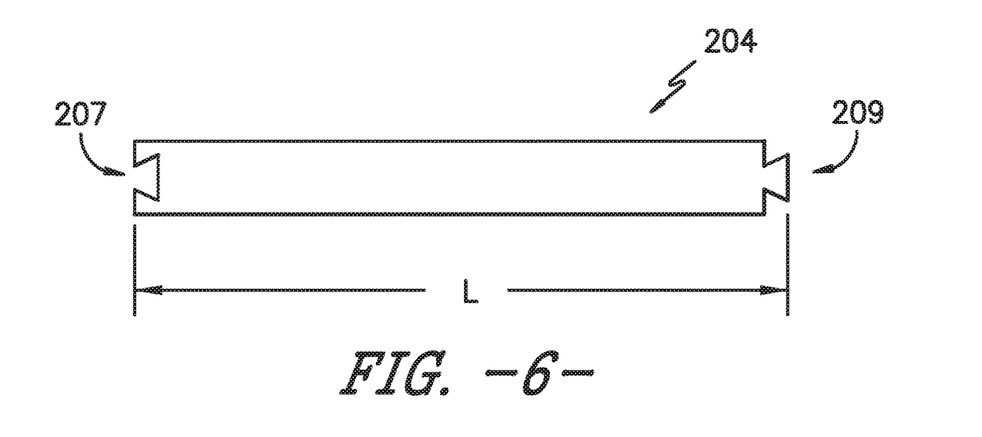
FIG. 6 provides an elevation view of one embodiment of a foam barrier of a system for insulating a water heater appliance according to exemplary embodiments of the present disclosure.

Further, as shown in FIGS. 4 and 5, the system 200 includes a compressed foam barrier 202 for positioning circumferentially around the tank 102 of the water heater 100. Moreover, as shown particularly in FIG. 5A, the compressed foam barrier 202 may be constructed of a foam body 204 that is compressed, at least in part, via a compression member 206. In such embodiments, as shown in FIG. 6, the foam body 204 may define a length L extending between a first end 207 and an opposing, second end 209. Thus, the foam body can be easily wrapped around the tank 102 at an intermediate position located above the combustion chamber 110 and respective first and second ends may be secured together.

Figure 7A:
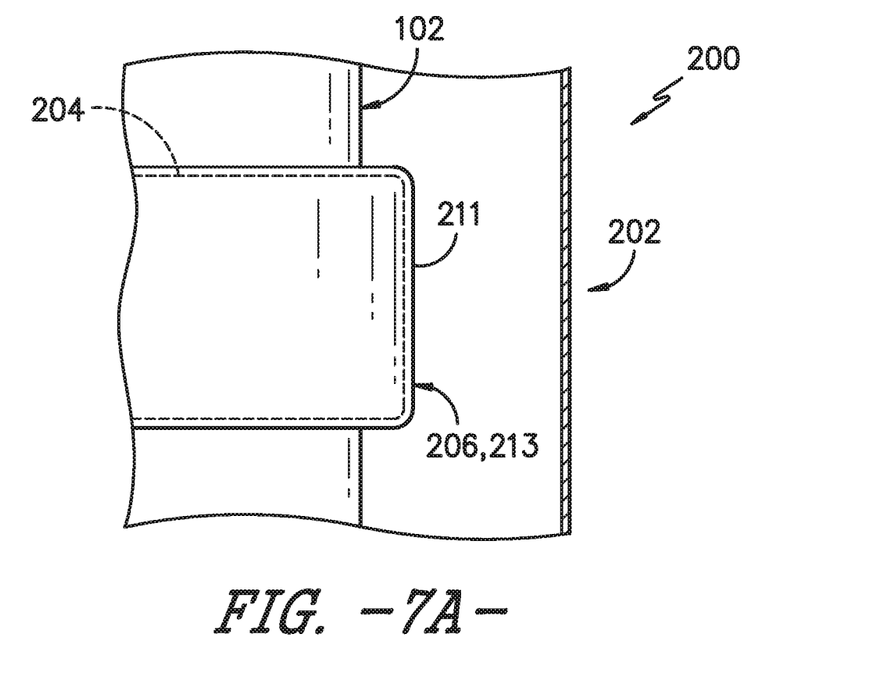
FIG. 7A provides a detailed, partial view of another embodiment of the water heater appliance according to exemplary embodiments of the present disclosure, particularly illustrating a compressed foam barrier installed around the water tank.
Figure 7B:
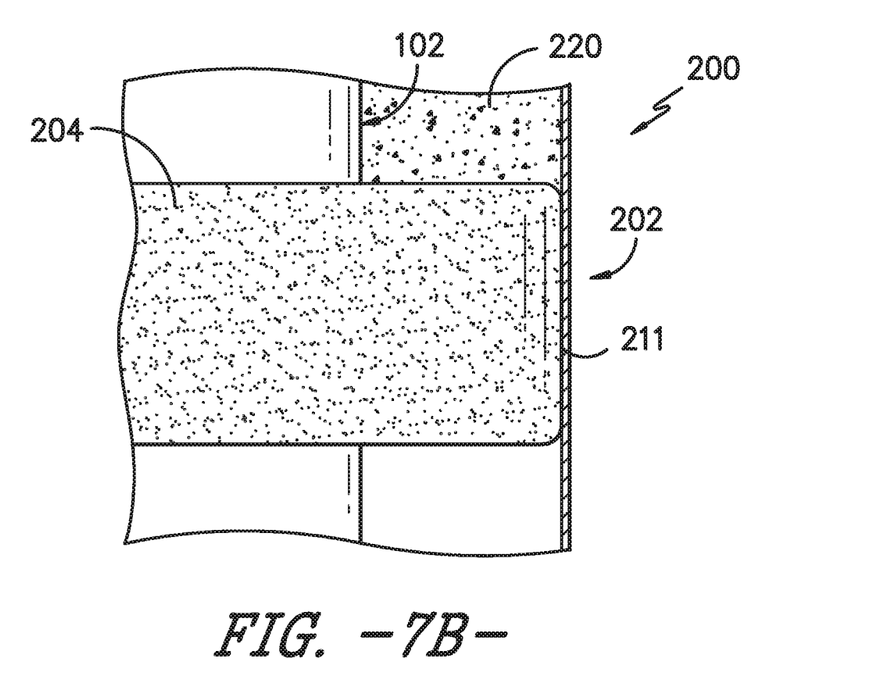
FIG. 7B provides a detailed, partial view of another embodiment of the water heater appliance according to exemplary embodiments of the present disclosure.

Further, in certain embodiments, as shown in FIG. 5A, the compression member 206 may be a strap member, a vacuum bag, a quick-release bond strip, and/or any other suitable member capable of temporarily compressing the foam body 204. For example, as shown in FIG. 5A, the compression member 206 corresponds to the strap member 205. In such embodiments, the strap member 205 may be adjustable (i.e. the strap member, similar to a belt, may be loosened or tightened to accommodate tanks of various sizes and/or to compress the foam body 204 as desired). In another embodiment, as shown in FIGS. 7A and 7B, the compression member 206 may be a vacuum bag 213. Thus, as shown in FIG. 7A, the foam body 204 may be compressed by drawing a vacuum within the vacuum bag 213.

Figure 5B:
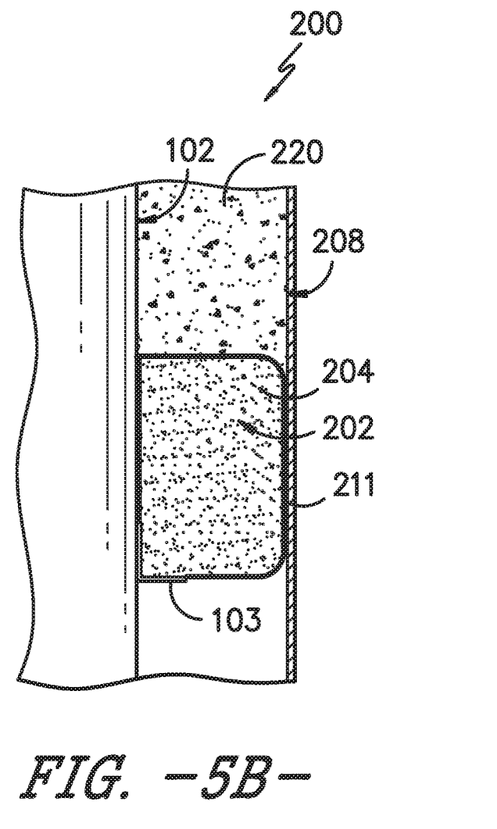
FIG. 5B provides a detailed, partial view of the water heater appliance of FIG. 4, particularly illustrating a decompressed foam barrier installed around the water tank.

Referring particularly to FIG. 4, the system 200 also includes a covering 208 for covering the tank 102 from a top end 210 to a bottom end 212. Further, as shown in FIGS. 4, 5A, and 5B, the covering 208 extends over the compressed foam barrier 202 when positioned around the tank 102. In certain embodiments, as an example, the covering 208 may be a steel covering. Thus, as discussed in more detail herein, upon installation around the tank 102, the compressed foam barrier 202 can be decompressed (FIGS. 5B and 7B) such that an outer diameter of the compressed foam barrier 202 expands up to and seals against an inner surface of the covering 208 so as to separate an internal volume 214 defined between an outer surface of the tank 102 and the covering 208 into a first section 216 and a second section 218. Accordingly, as shown, an injectable foam material 220 can be injected to provide a foam barrier around at least a portion of an outer surface of the tank 102.

Referring now to FIG. 11, a flow diagram of the method 300 for insulating the water heater 100 according to the present disclosure is provided. It should be understood that FIG. 11 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (302), the method 300 includes providing the compressed foam barrier 204 circumferentially around the tank 102. In one embodiment, as shown in FIGS. 5A and 5B, the tank 102 may include a flange 103, such as L-flange, on the outer surface thereof. In such embodiments, the method 300 may include positioning the compressed foam barrier 204 circumferentially around the tank 102 atop the flange 103. In addition, in an embodiment, as mentioned, the compressed foam barrier 204 may be constructed of foam body 204 that is compressed, at least in part, via a compression member 206. Further, as mentioned, the foam body 204 may be compressed via a strap member 205 or within the vacuum bag 213. Thus, in an embodiment, the method 300 may include wrapping the foam body 204 around the tank 104 at an intermediate position located above the combustion chamber 110 and securing the first and second ends 207, 209 together. In addition, in certain embodiments, the method 300 may include tightening the strap member 205 after positioning the compressed foam barrier circumferentially around the tank 102.

Figure 8:
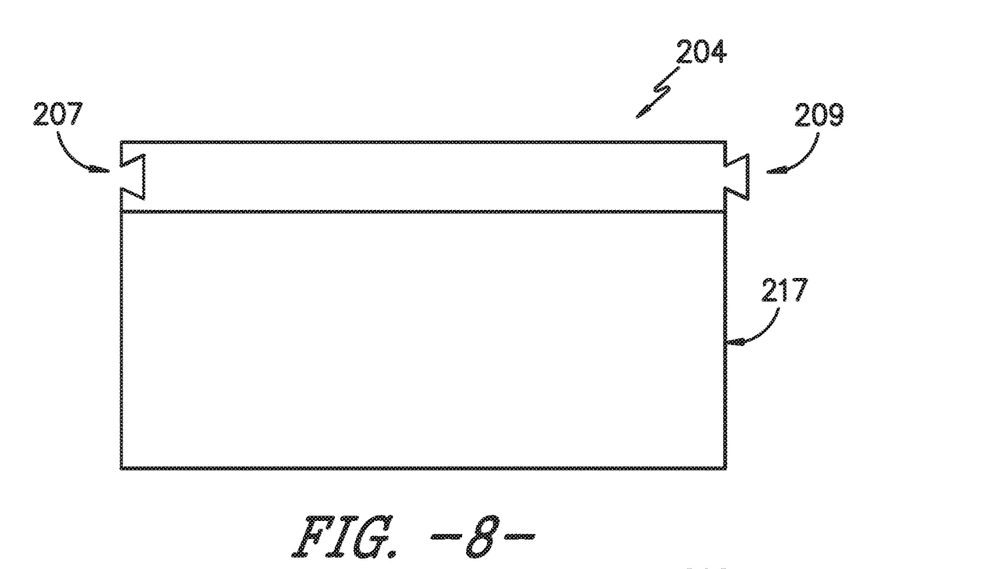
FIG. 8 provides an elevation view of another embodiment of a foam barrier of a system for insulating a water heater appliance according to exemplary embodiments of the present disclosure.

In certain embodiments, as shown in FIG. 8, the method 300 may also include securing an insulation blanket 217 to the strap member 205 such that positioning of the compressed foam barrier 204 circumferentially around the tank 102 also positions the insulation blanket around the combustion chamber 110. For example, as shown, by securing the insulation blanket 217 to the foam body 204, the foam body 204 and the insulation blanket 217 act similar to a belt and skirt when wrapped around the tank 102.

In addition, in an embodiment, the first and second ends 207, 209 may be secured together by securing interlocking components of the first and ends 207, 209 together. For example, as shown in FIG. 6, the interlocking ends 207, 209 may include a dovetail joint. It should be further understood that any suitable interlocking components having any suitable shape may be used to join the first and second ends 207, 209 together. In alternative embodiments, as shown in FIG. 9, securing the first and second ends 207, 209 together may include arranging the first and second ends 207, 209 together such that the first and second ends 207, 209 abut against each other. In such embodiments, as shown, the method 300 may include providing an adhesive 215 between the abutting first and second ends 207, 209.

In yet another embodiment, as shown in FIG. 10, the foam body 204 may define a continuous annular shape. In such embodiments, providing the compressed foam barrier 204 circumferentially around the tank 102 may include sliding the foam body 204 from the top end 210 of the tank 102 to an intermediate position on the tank 102 above the combustion chamber 110.

Referring back to FIG. 11, as shown at (304), the method 300 includes positioning the covering 208 around the tank 102 from the top end 210 to the bottom end 212 such that the covering 208 extends over the compressed foam barrier 204. For example, in an embodiment, the covering 208 may be slid around the tank 102 so as to cover the tank 102 from the top end 210 to the bottom end 212.

Once the covering 208 is in place, as shown at (306), the method 300 includes decompressing the compressed foam barrier 204 such that an outer diameter 211 of the compressed foam barrier 204 expands up to and seals against the covering 208 so as to separate the internal volume 214 defined between an outer surface of the tank 102 and the covering 208 into the first section 216 and the second section 218. For example, as shown in FIG. 5A, the compressed foam barrier 204 may be positioned in a compressed position and then allowed to expand (as indicated via hatching) up to the covering 208 to create a seal with the covering 208. More specifically, in the embodiment of FIG. 5B, decompressing the compressed foam barrier 204 may include cutting or clipping the strap member 205 or engaging a quick-release bond strip of the strap member 205 to allow the foam body 204 to expand. In another embodiment, as shown in FIGS. 7A and 7B, decompressing the compressed foam barrier 204 may include releasing pressure within the vacuum bag 213 so as to allow the foam body 204 to expand.

Referring back to FIG. 11, as shown at (308), once the foam barrier 204 is allowed to expand, the method 300 includes injecting a foam material 220 into the first section 216 of the internal volume 214 so as to provide a foam barrier around at least a portion of the outer surface of the tank 102. In such embodiments, the foam material 220 may be injected as a flowable liquid foam that forms the foam barrier upon drying. Thus, the foam barrier 204 prevents the foam material 220 from entering the second section 218 of the internal volume 214.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for insulating a gas-fueled water heater, the gas-fueled water heater having a tank for storage of water for heating and a combustion chamber adjacent to the tank, the combustion chamber containing a gas burner to heat the water in the tank, the method comprising:
   providing a compressed foam barrier circumferentially around the tank, wherein the compressed foam barrier is constructed of a foam body that is compressed, at least in part, via a strap member;
   positioning a covering around the tank from a top end to a bottom end, the covering extending over the compressed foam barrier;
   decompressing the compressed foam barrier such that an outer diameter of the compressed foam barrier expands up to and seals against the covering so as to separate an internal volume defined between an outer surface of the tank and the covering into a first section and a second section, wherein decompressing the compressed foam barrier further comprises cutting the strap member or engaging a quick-release bond strip of the strap member to allow the foam body to expand; and
   injecting a foam material into the first section of the internal volume so as to provide a foam barrier around at least a portion of an outer surface of the tank, wherein the foam barrier prevents the foam material from entering the second section of the internal volume.

2. The method of claim 1, further comprising tightening the strap member after positioning the compressed foam barrier circumferentially around the tank.

3. The method of claim 1, wherein the foam body defines a length extending between a first end and an opposing, second end, wherein providing the compressed foam barrier circumferentially around the tank further comprises:
   wrapping the foam body around the tank at an intermediate position located above the combustion chamber; and
   securing the first and second ends together.

4. The method of claim 3, wherein securing the first and second ends together further comprises securing interlocking components of the first and ends together.

5. The method of claim 3, wherein securing the first and second ends together further comprises:
   arranging the first and second ends together such that the first and second ends abut against each other; and
   providing an adhesive between the abutting first and second ends.

6. The method of claim 1, wherein the foam body defines a continuous annular shape, wherein providing the compressed foam barrier circumferentially around the tank further comprises sliding the foam body from the top end of the tank to an intermediate position on the tank above the combustion chamber.

7. The method of claim 1, wherein positioning the covering around the tank from the top end to the bottom end further comprises sliding the covering around the tank from the top end to the bottom end.

8. The method of claim 1, wherein the compressed foam barrier is constructed of a foam body compressed within a vacuum bag, wherein decompressing the compressed foam barrier further comprises releasing pressure within the vacuum bag so as to allow the foam body to expand.

9. The method of claim 1, further comprising at least one flange on an outer surface of the tank and positioning the compressed foam barrier circumferentially around the tank atop the flange.

10. The method of claim 1, further comprising securing an insulation blanket to the strap member such that positioning of the compressed foam barrier circumferentially around the tank also positions the insulation blanket around the combustion chamber.

11. The method of claim 1, wherein the foam material is injected as a flowable liquid foam that forms the foam barrier upon drying.

12. A system for insulating a gas-fueled water heater, the system comprising:
   a compressed foam barrier for positioning circumferentially around a tank of the water heater, wherein the compressed foam barrier is constructed of a foam body that is compressed, at least in part, via a strap member;
   a covering for covering the tank from a top end to a bottom end, the covering extending over the compressed foam barrier when positioned around the tank, wherein, upon installation around the tank, the compressed foam barrier is decompressed such that an outer diameter of the compressed foam barrier expands up to and seals against an inner surface of the covering so as to separate an internal volume defined between an outer surface of the tank and the covering into a first section and a second section, wherein the compressed foam barrier is decompressed by cutting the strap member or engaging a quick-release bond strip of the strap member to allow the foam body to expand; and
   an injectable foam material for providing a foam barrier around at least a portion of an outer surface of the tank.

13. The system of claim 12, wherein the strap member is adjustable.

14. The system of claim 12, wherein the foam body defines a length extending between a first end and an opposing, second end, wherein the foam body is configured for wrapping around the tank at an intermediate position located above a combustion chamber, the first and second ends configured for securing to each other.

15. The system of claim 14, wherein the first and second ends further comprise corresponding interlocking components for securing the first and ends together.

16. The system of claim 12, wherein the tank comprises at least one flange on an outer surface thereof for providing a location for the compressed foam barrier.

17. The system of claim 12, further comprising an insulation blanket arranged with the compression member such that positioning of the compressed foam barrier circumferentially around the tank also positions the insulation blanket around a combustion chamber.

* * * * *